(12) United States Patent
Koike

(10) Patent No.: US 9,229,673 B2
(45) Date of Patent: Jan. 5, 2016

(54) PRINTING APPARATUS WHICH PRINTS ON A SHEET CONVEYED FROM ONE OF SHEET STORAGE UNITS

(71) Applicant: CANON KABUSHIKI KAISHA, Tokyo (JP)

(72) Inventor: Hisashi Koike, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/313,290

(22) Filed: Jun. 24, 2014

(65) Prior Publication Data
US 2015/0002881 A1 Jan. 1, 2015

(30) Foreign Application Priority Data
Jul. 1, 2013 (JP) .................................. 2013-138441

(51) Int. Cl.
*G06F 3/12* (2006.01)
*G06K 15/16* (2006.01)
*G06K 15/02* (2006.01)
*G06K 15/00* (2006.01)

(52) U.S. Cl.
CPC ............ *G06F 3/1294* (2013.01); *G06K 15/005* (2013.01); *G06K 15/16* (2013.01); *G06K 15/1807* (2013.01); *G06K 15/4065* (2013.01)

(58) Field of Classification Search
None
See application file for complete search history.

(56) References Cited

U.S. PATENT DOCUMENTS

2002/0063881 A1* 5/2002 Nakata et al. ................. 358/1.14
2014/0168671 A1 6/2014 Kanamoto et al.

FOREIGN PATENT DOCUMENTS

JP 2010-284919 A 12/2010
JP 2011-64940 A 3/2011

* cited by examiner

*Primary Examiner* — Thomas D Lee
(74) *Attorney, Agent, or Firm* — Fitzpatrick, Cella, Harper & Scinto

(57) ABSTRACT

It is determined whether an attribute of the sheet of a printing target job is different from the attribute of a sheet in a sheet storage unit designated by the attribute of the sheet of the job. When it is determined that the attribute of the sheet of the printing target job is different from the attribute of the sheet in the sheet storage unit, it is determined whether the attribute of the sheet of another job also designates the sheet storage unit. When it is determined that the attribute of the sheet of the other job also designates the sheet storage unit, a warning about a change of the attribute of the sheet in the sheet storage unit is displayed.

9 Claims, 15 Drawing Sheets

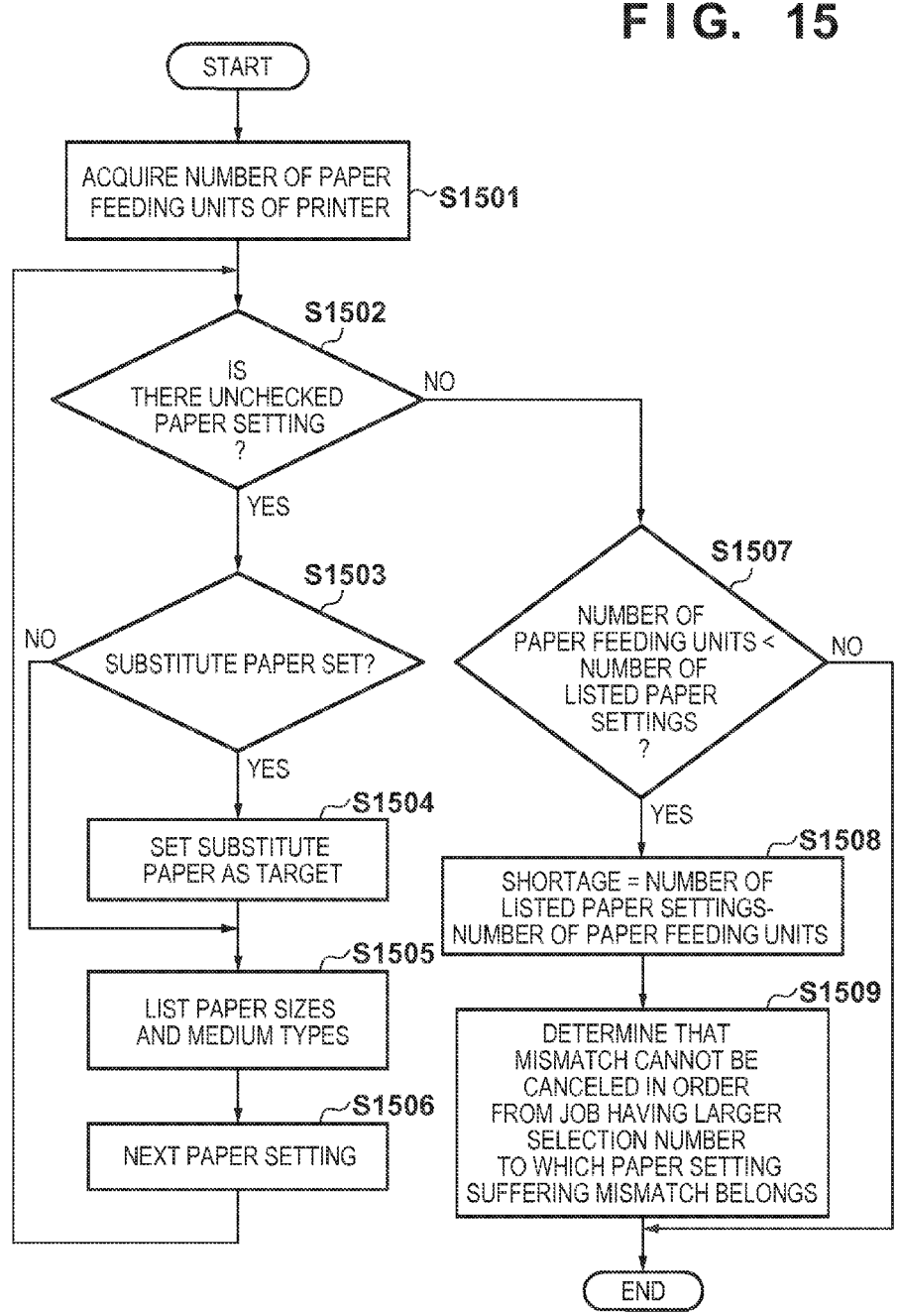

PRINTING APPARATUS WHICH PRINTS ON A SHEET CONVEYED FROM ONE OF SHEET STORAGE UNITS

BACKGROUND OF THE INVENTION

1. Field of the Invention

The present invention relates to a printing apparatus which prints on a sheet conveyed from a sheet storage unit, a display control method, and a storage medium storing a program.

2. Description of the Related Art

When inputting a job to a printing apparatus, the user confirms the attributes and presence/absence of a sheet set in the sheet storage unit of the printing apparatus, and then inputs the job.

After inputting the job, if the attributes of a sheet designated by the job and those of a sheet set in the sheet storage unit of the printing apparatus do not match each other, printing does not start and an error is displayed on a user interface. This can prevent execution of printing in a state in which sheet attributes do not match each other, and output of a printed material not intended by the user. To cancel a mismatch between attributes, Japanese Patent Laid-Open No. 2010-284919 has disclosed a method of designating a sheet of other attributes as a substitute by the user for a job. Japanese Patent Laid-Open No. 2011-64940 has disclosed a method of searching for a usable sheet based on conditions.

When the user selects a job in which a sheet attribute mismatch has occurred, a sheet substitution screen is displayed. The sheet attribute mismatch is canceled by changing the sheet setting of a sheet storage unit suffering the mismatch to another sheet setting in accordance with contents displayed on the sheet substitution screen. However, a sheet attribute mismatch may newly occur for another job which is to use the sheet setting of the sheet storage unit before the change.

SUMMARY OF THE INVENTION

An aspect of the present invention is to eliminate the above-mentioned problems with the conventional technology. The present invention provides a printing apparatus which prevents a sheet attribute mismatch from newly occurring upon changing the sheet attributes of a sheet storage unit, a display control method, and a storage medium storing a program.

The present invention in one aspect provides a printing apparatus which prints on a sheet conveyed from a sheet storage unit, comprising: a storage unit configured to store a plurality of jobs containing attributes of sheets to be used for printing; a first determination unit configured to determine whether an attribute of the sheet of the job stored in the storage unit is different from an attribute of a sheet in a sheet storage unit designated by the attribute of the sheet of the job; a second determination unit configured to, in a case where the first determination unit determines that the attribute of the sheet of the job stored in the storage unit is different from the attribute of the sheet in the sheet storage unit, determine whether the attribute of the sheet of another job different from the job out of the plurality of jobs designates the sheet storage unit; and a display control unit configured to, in a case where the second determination unit determines that the attribute of the sheet of the another job designates the sheet storage unit, display a warning about a change of a paper setting of the sheet storage unit.

The present invention can prevent a sheet attribute mismatch from newly occurring upon changing the sheet attributes of a sheet storage unit.

Further features of the present invention will become apparent from the following description of exemplary embodiments with reference to the attached drawings.

BRIEF DESCRIPTION OF THE DRAWINGS

FIG. 15 is a flowchart showing the detailed procedures of processing in step S1409.

DESCRIPTION OF THE EMBODIMENTS

Figure 1:
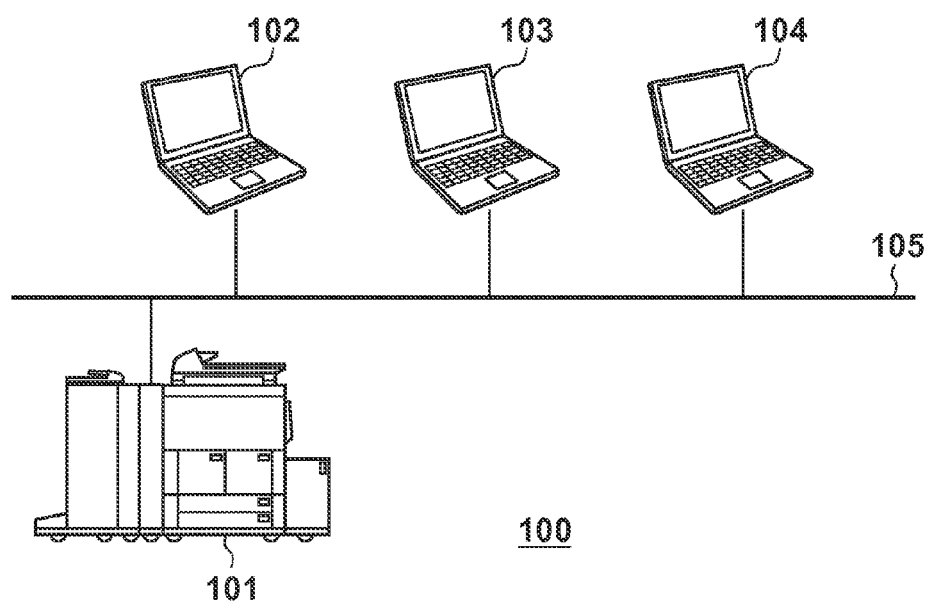
FIG. 1 is a view showing the arrangement of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a description thereof will not be repeated.

[First Embodiment]

FIG. 1 is a view showing the arrangement of a printing system according to the embodiment. A printing system 100 includes a printing apparatus 101, and host computers 102, 103, and 104, which are connected via a network 105 so that they can communicate with each other. The host computers 102 to 104 are, for example, general-purpose PCs. Each of the host computers 102 to 104 generates a job for causing the printing apparatus 101 to print, and transmits the job to the printing apparatus 101. Here, the job includes a copy job in addition to a print job.

Figure 2:
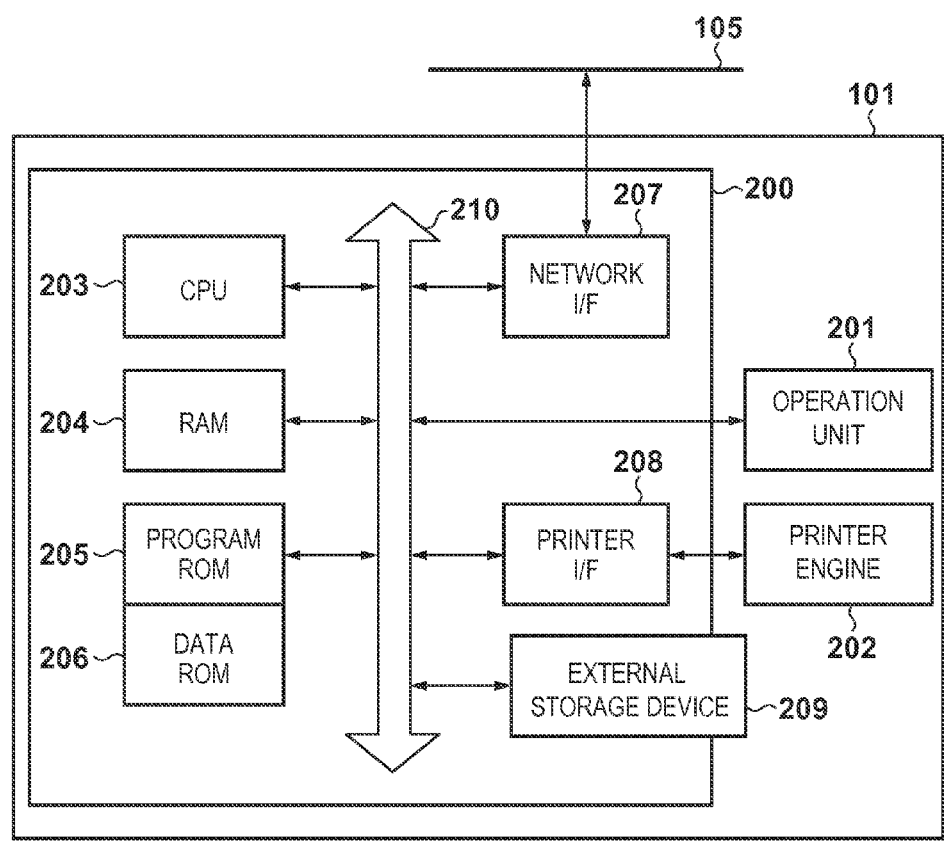
FIG. 2 is a block diagram showing a hardware arrangement around the controller of the printing apparatus.

FIG. 2 is a block diagram showing a hardware arrangement around the controller of the printing apparatus 101. A CPU 203 reads out various programs stored in a program ROM 205 and executes them. These programs include a control program for implementing an operation according to the embodiment. By reading out the control program from the program ROM 205 to a RAM 204 and executing it, the CPU 203 controls each unit of the printing apparatus 101 to implement the operation according to the embodiment. The RAM 204 is used as a main memory when the CPU 203 executes various programs, or a work area for temporarily storing image data, parameters, and the like. A data ROM 206 stores data necessary to execute various programs. The data ROM 206 stores, for example, data representing font information and the like.

A network interface (I/F) 207 is connected to the network 105, and receives jobs transmitted from the host computers 102 to 104. A printer I/F 208 enables communication between a printer engine 202 and a controller 200. An external storage device 209 is, for example, a hard disk or flash memory. These building components from the CPU 203 to the external storage device 209 are connected via a system bus 210 so that they can communicate with each other. An operation unit 201 includes a display and keyboard, and displays a user interface (UI) screen on the display. The user interface screen can accept various instructions from the user, such as job selection and execution of printing. The user interface can display a list of jobs which have been externally received and held in the printing apparatus 101.

Figure 3:
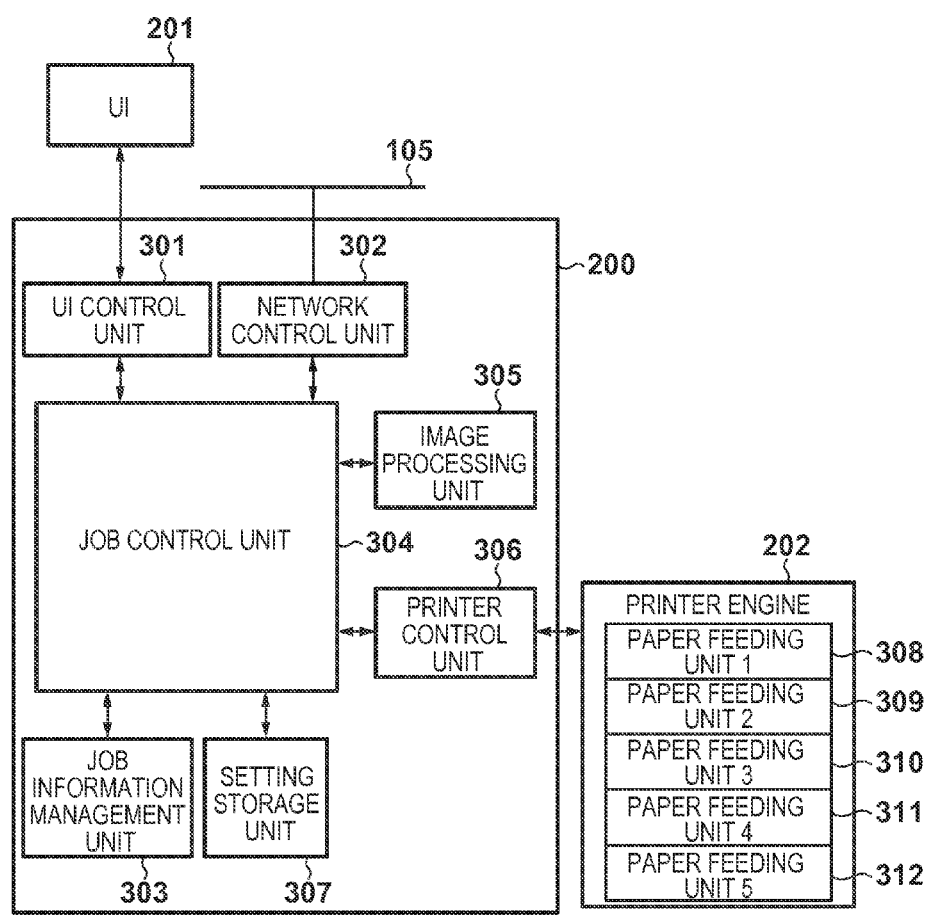
FIG. 3 is a block diagram showing a software arrangement around the controller of the printing apparatus.

FIG. 3 is a block diagram showing a software arrangement around the controller of the printing apparatus 101. The external storage device 209 temporarily holds an externally received job. A UI control unit 301, network control unit 302, job information management unit 303, image processing unit 305, printer control unit 306, and setting storage unit 307 are implemented by executing control programs stored in the program ROM 205 by the CPU 203. The UI control unit 301 performs display control of the operation unit 201. The network control unit 302 enables communication between a job control unit 304 and the network 105. The image processing unit 305 executes various image processes (for example, color conversion processing and correction processing) on image data to be printed. The printer control unit 306 controls the printer engine 202. Paper feeding units 308, 309, 310, 311, and 312 are sheet storage units in which printing media (sheets) such as printing paper are stacked. The printing apparatus 101 feeds printing media from the paper feeding units 308, 309, 310, 311, and 312, conveys them, and prints images on the conveyed printing media. The printer engine 202 detects and manages the remaining paper amounts of the paper feeding units 308 to 312. The setting storage unit 307 stores various settings regarding printing as attributes. For example, the setting storage unit 307 stores, as information representing paper attributes, information of a paper setting made for each paper feeding unit. The information of the paper setting made for each paper feeding unit includes the paper size and medium type. The medium type is information representing, for example, the material of a printing medium such as plain paper or coated paper. The job information management unit 303 stores information of the paper setting of a job held in the external storage device 209. The information of the paper setting stored in the job information management unit 303 includes a paper feeding unit, paper size, and medium type which are designated by a job.

Figure 4:
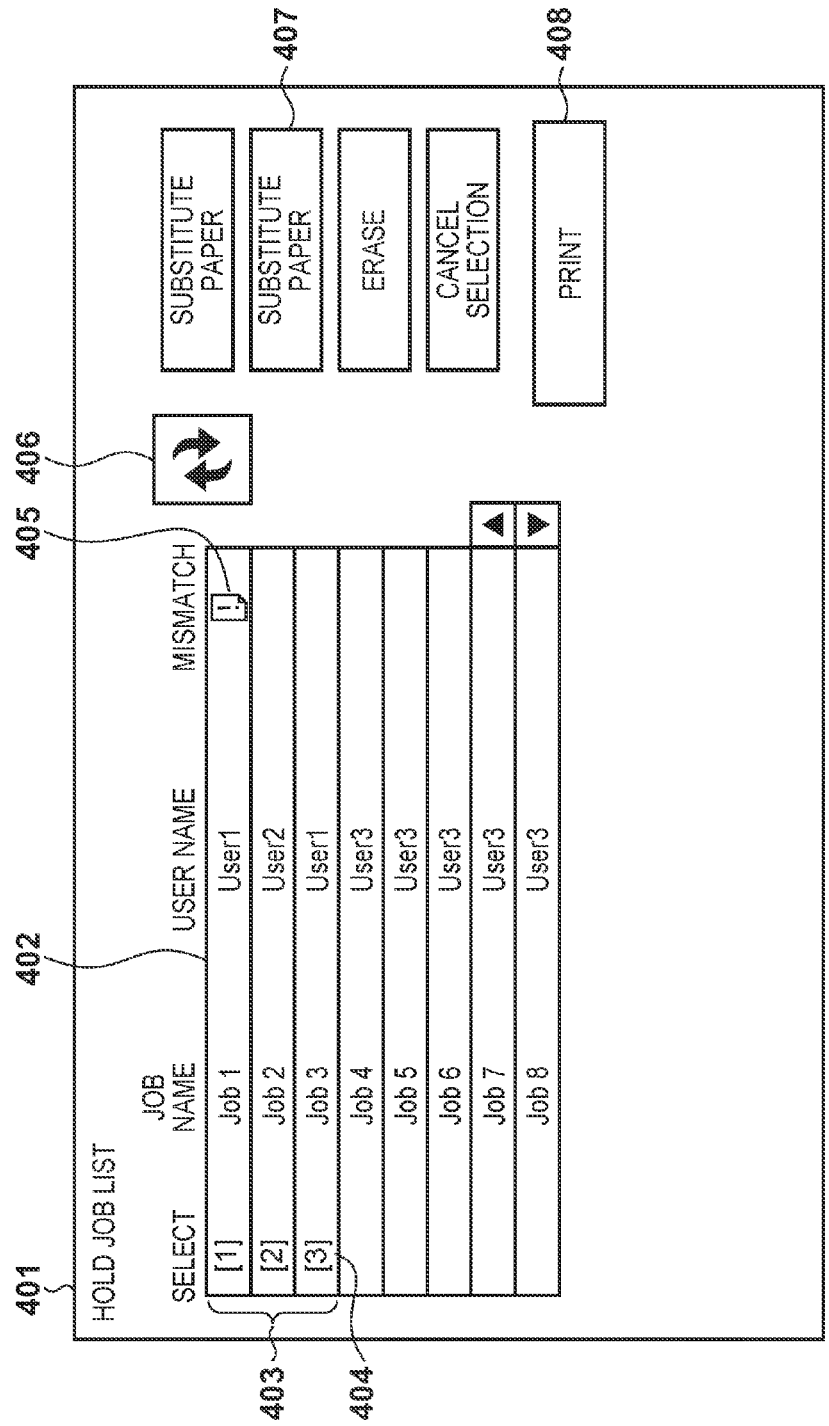
FIG. 4 is a view showing an example of a hold job list screen displayed on an operation unit.

FIG. 4 is a view showing an example of a hold job list screen displayed on the operation unit 201. A hold job list screen 401 displays, as a job list 402, a list of jobs held in the external storage device 209. The user can select, from the job list, a job he wants to print, and designate execution of printing. In the embodiment, the user can select a plurality of jobs. In FIG. 4, the user selects three jobs represented by a display 403. A display 404 represents the order of selection by the user. An icon 405 represents that a medium mismatch has occurred for the job. The medium mismatch represents that a paper setting used by a job and the paper setting of a paper feeding unit designated by the paper setting of the job are different from each other. By pressing a button 406, the user can update the job list 402 to the latest state. When substitute paper (to be described later) is set, if the button 406 is pressed on this screen, the substitute paper setting is reflected and, for example, the icon 405 is displayed for another job. A button 407 is a button for changing to a screen used to make a substitute paper setting for a selected job. A button 408 is a button for designating execution of printing by the user for a selected job.

Figure 5:
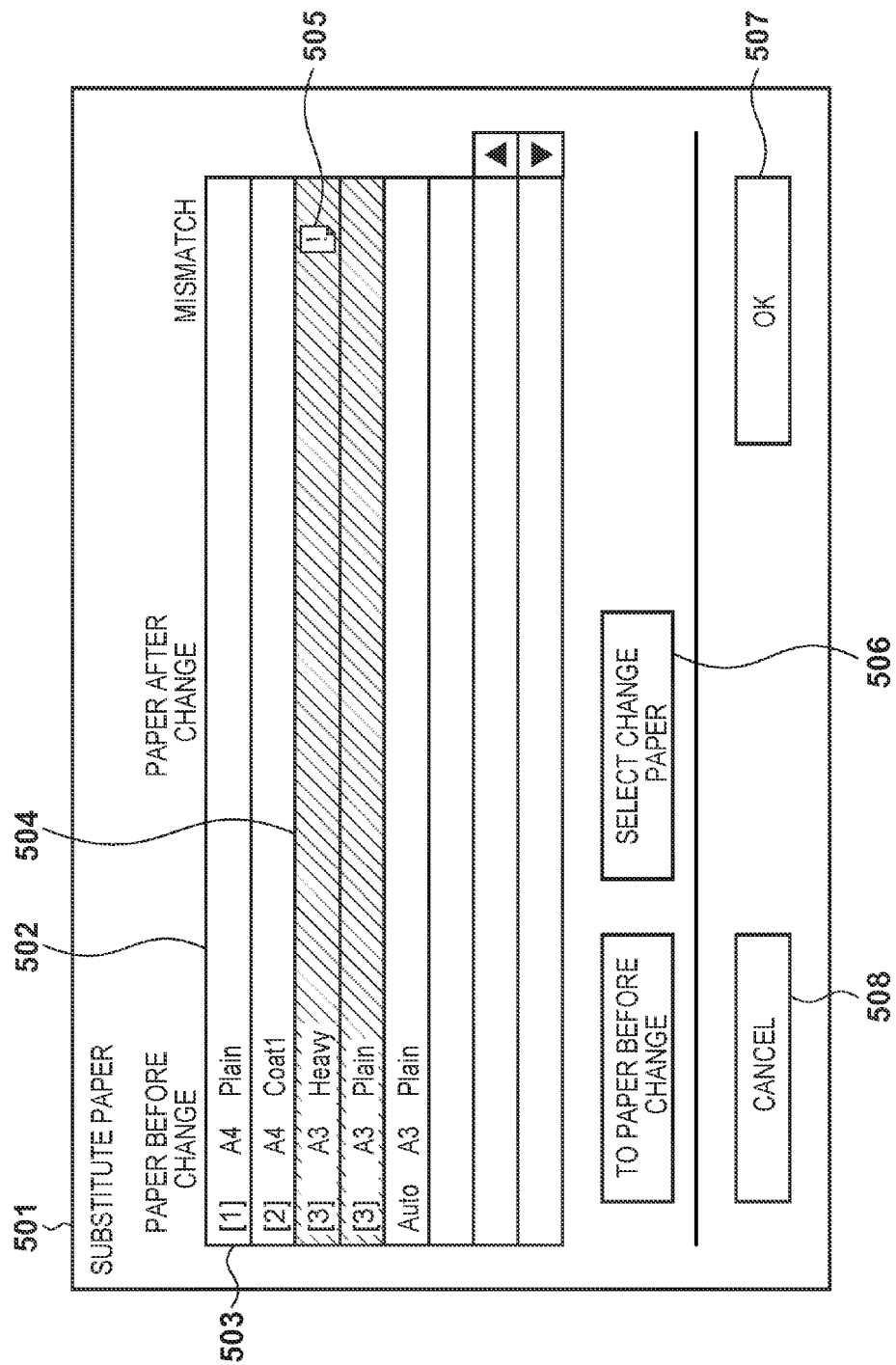
FIG. 5 is a view showing an example of a paper substitution screen according to the first embodiment.

FIG. 5 is a view showing an example of a paper substitution screen. A paper substitution screen 501 is displayed when the button 407 in FIG. 4 is pressed. A list 502 displays a list of all paper settings used by all jobs selected in the job list 402. A display 503 represents a paper setting "paper feeding unit 1, A4 size, medium type: Plain". As for a paper setting for which the background color is white, as in the display 503, no substitute paper is set, and no medium mismatch has occurred. In a display 504, a state in which two different paper settings on the third and fourth lines are made for paper feeding unit 3 is displayed in a discriminable background color. An icon 505 represents that a medium mismatch has occurred. A button 506 is a button for changing to a substitute paper selection screen (not shown). A button 507 is a button for finalizing substitute paper selected on the substitute paper selection screen. A button 508 is a button for canceling contents set on the paper substitution screen 501.

[Paper Substitution Screen Display Processing]

Figure 6:
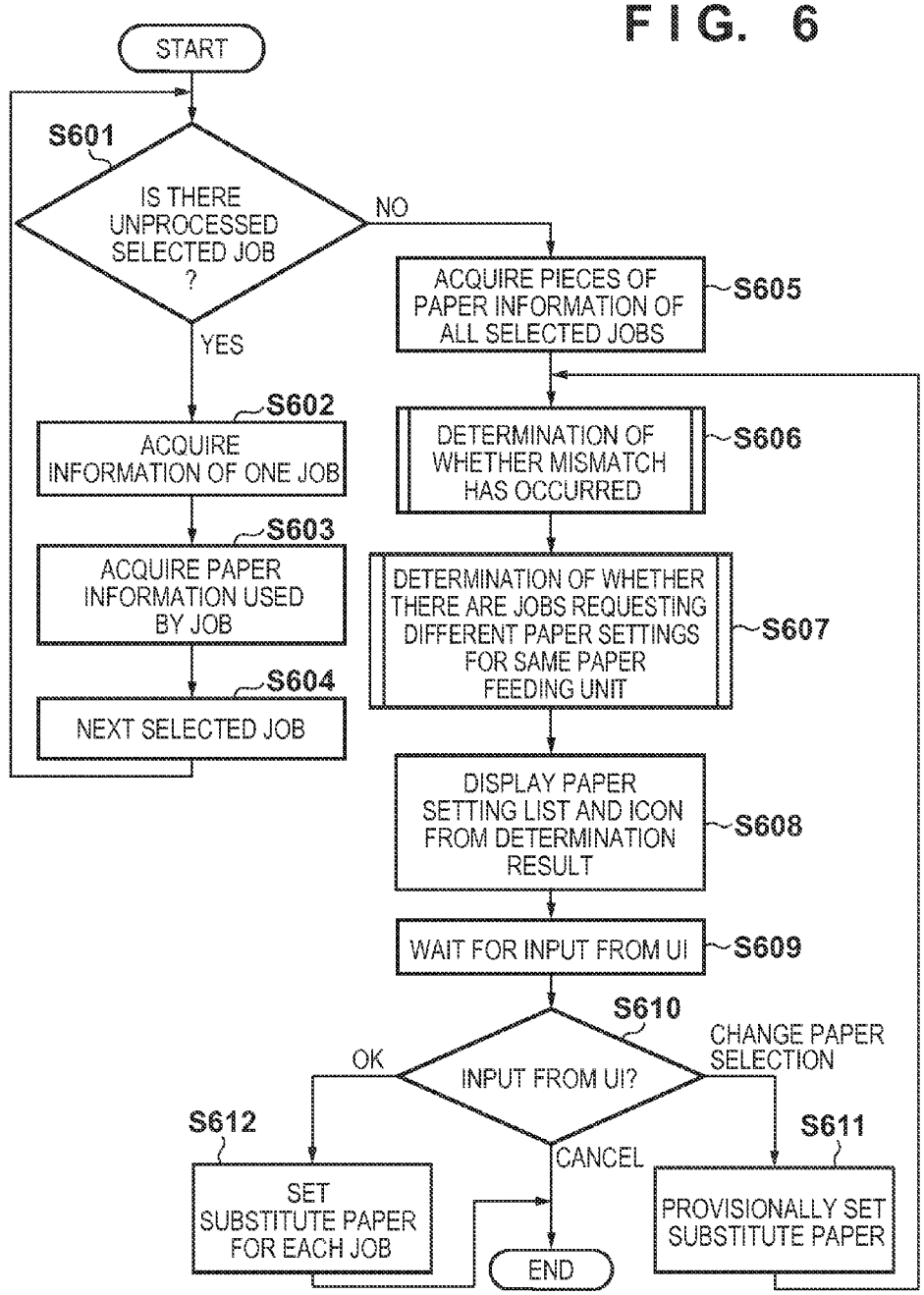
FIG. 6 is a flowchart showing the procedures of paper substitution screen display processing.

FIG. 6 is a flowchart showing the procedures of paper substitution screen display processing. Each process shown in FIG. 6 is implemented by, for example, executing, by the CPU 203, a control program stored in the program ROM 205. When the user presses the update button 406 or selected paper substitution button 407 while selecting a plurality of jobs on the hold job list screen 401, the processing shown in FIG. 6 starts.

If the job control unit 304 detects pressing of the button 406 or 407 from the operation unit 201 via the UI control unit 301, it determines in step S601 whether there is an unprocessed job among jobs selected by the user. "Unprocessed" indicates that processes in steps S602 to S604 have not been executed yet. If the job control unit 304 determines that there is an unprocessed job, it specifies one job in accordance with, for example, the order of selection by the user, and the process advances to step S602. In step S602, the job control unit 304 acquires the paper setting of the specified job from the job information management unit 303. The paper setting includes a paper feeding unit, paper size, and medium type which are designated by the job.

In step S603, the job control unit 304 acquires all paper settings used by the job, and stores them in the RAM 204. The job uses one paper setting or a plurality of paper settings. When a job uses a plurality of paper settings, for example, paper settings "paper feeding unit 1, A4, Plain" and "paper feeding unit 3, A3, Heavy" used by the job are acquired. Information about a paper feeding unit may be an ID uniquely assigned in advance to each paper feeding unit. If the job uses a plurality of paper settings and their contents overlap each other, only the contents of one paper setting are stored in the RAM 204 in step S603. In step S604, the job control unit 304 specifies the next job in accordance with, for example, the order of selection by the user. If the job control unit 304 determines in step S601 that there is no unprocessed job among jobs selected by the user, the process advances to step S605. In step S605, the job control unit 304 stores, in the RAM 204, all paper settings used by each job selected by the user. At this time, if the contents overlap each other, only the contents of one paper setting are stored in the RAM 204.

In step S606, the job control unit 304 determines whether a medium mismatch has occurred for each paper setting or each job. Details of the processing in step S606 will be described later. In step S607, the job control unit 304 determines whether different paper settings are made for the same paper feeding unit. Details of the processing in step S607 will be described later.

In step S608, based on the determination results of steps S606 and S607, the job control unit 304 displays, on the operation unit 201, the paper substitution screen 501 or the hold job list screen 401 updated to the latest state. In step S609, the job control unit 304 waits for an input from the user on the paper substitution screen 501. As shown in FIG. 5, the icon 505 represents that a medium mismatch has been determined for the third paper setting counted from the top. Also, the background color is displayed to be discriminable, and this represents that the third and fourth paper settings are made for the same paper feeding unit.

In step S610, the job control unit 304 determines a user input on the operation unit 201. If the job control unit 304 determines that the input is pressing of the change paper selection button 506 shown in FIG. 5, it changes the paper substitution screen 501 to a change paper selection screen (not shown), and the process advances to step S611. The change paper selection screen is a screen for selecting a usable paper setting instead of a paper setting in which a medium mismatch has occurred. If substitute paper is set on the change paper selection screen, the job control unit 304 stores the substitute paper as a provisional substitute paper setting in the RAM 204 in step S611, and repeats the processing from step S606.

If the job control unit 304 determines in step S610 that the user input is pressing of the OK button 507 shown in FIG. 5, it stores the provisional substitute paper setting stored in step S611 as a new paper setting in the external storage device 209. The processing in FIG. 6 then ends. If the job control unit 304 determines in step S610 that the user input is pressing of the cancel button 508 shown in FIG. 5, it deletes the provisional substitute paper setting stored in step S611, and the processing in FIG. 6 ends.

Figure 7:
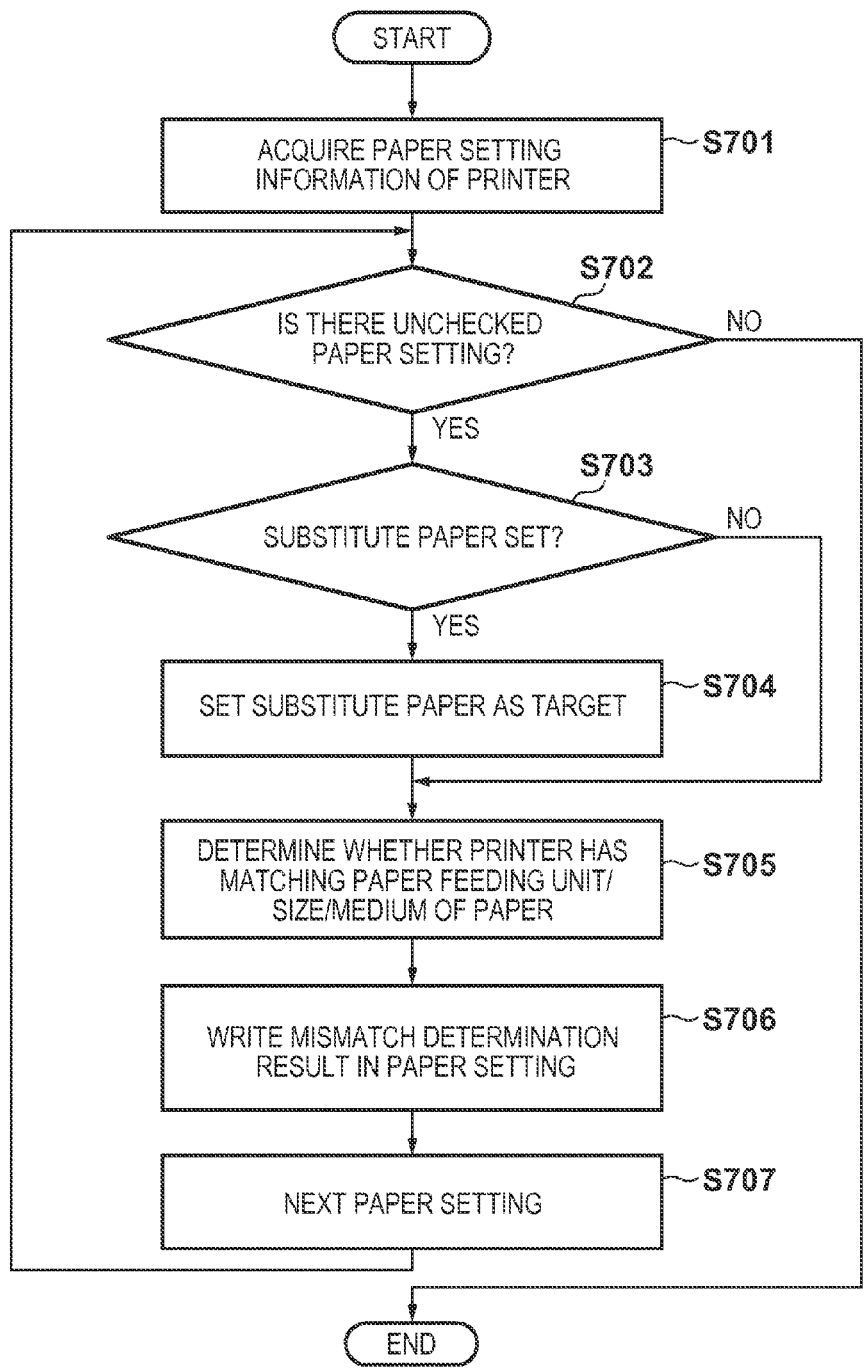
FIG. 7 is a flowchart showing the detailed procedures of processing in step S606.

FIG. 7 is a flowchart showing the detailed procedures of the processing in step S606 of FIG. 6. In step S701, the job control unit 304 acquires, from the printer engine 202 via the printer control unit 306, information of paper settings currently made for the paper feeding units 308 to 312. The information of the paper setting to be acquired is information containing a paper feeding unit ID, paper size, and medium type. At this time, the printer engine 202 may not be able to acquire all pieces of information of paper settings. In this case, information of a paper setting corresponding to a paper feeding unit ID may be acquired from the setting storage unit 307 to complement the information.

In step S702, the job control unit 304 determines whether there is an unprocessed paper setting among paper settings stored in the RAM 204 for each job in step S605. "Unprocessed" indicates that processes in steps S703 to S707 have not been executed yet. If the job control unit 304 determines that there is no unprocessed paper setting, the processing in FIG. 7 ends. If the job control unit 304 determines that there is an unprocessed paper setting, it specifies one paper setting, and the process advances to step S703. For example, a paper setting may be specified in the order of storage in the RAM 204 in step S605. In step S703, the job control unit 304 determines whether substitute paper has been set for the paper setting. The state in which substitute paper has been set is a state in which substitute paper has been set in step S611 of FIG. 6. If the job control unit 304 determines that the substitute paper has been set, it sets the substitute paper setting as the processing target in FIG. 7 in step S704. If the job control unit 304 determines that no substitute paper has been set, it sets the current paper setting as the processing target in FIG. 7, and the process advances to step S705.

In step S705, the job control unit 304 determines whether the processing target paper setting "paper feeding unit ID, paper size, medium type" matches "paper size, medium type" set for each paper feeding unit acquired in step S701, respectively. In step S706, the job control unit 304 stores the determination result of step S705 in the RAM 204 in association with each paper setting. In step S707, the job control unit 304 specifies the next paper setting and repeats the processing from step S702.

In the embodiment, by the processing of FIG. 7, whether a medium mismatch has occurred is determined for each paper setting used by a plurality of jobs selected by the user. For a paper setting for which it is determined that a medium mismatch has occurred, a warning can be displayed as in the icon 505.

Figure 8:
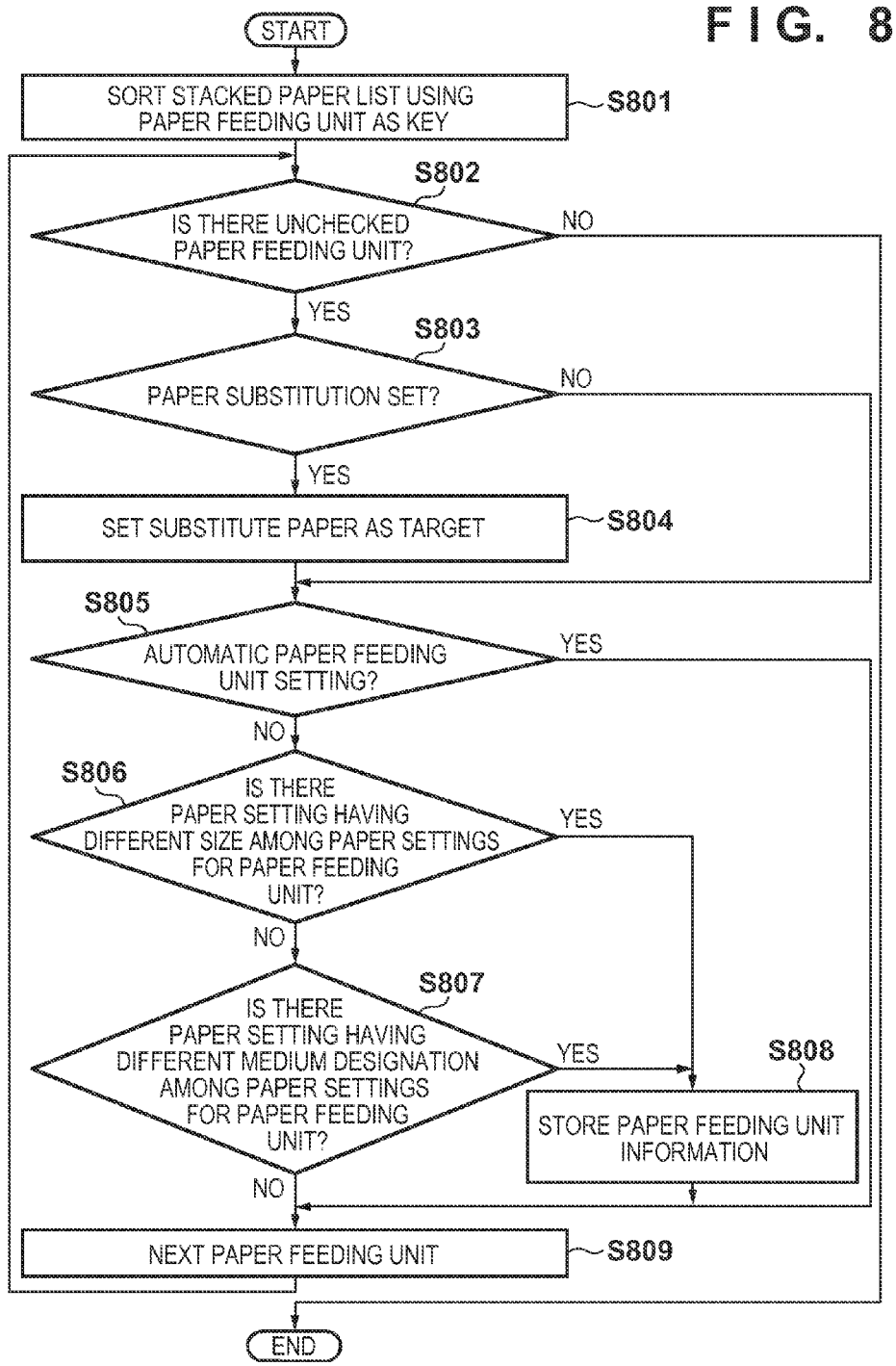
FIG. 8 is a flowchart showing the detailed procedures of processing in step S607.

FIG. 8 is a flowchart showing the detailed procedures of the processing in step S607 of FIG. 6. In step S801, the job control unit 304 sorts, by using the paper feeding unit ID as a key, paper settings stored for each job in step S605. In step S802, the job control unit 304 determines whether there is an unprocessed paper feeding unit ID of each sorted paper setting. "Unprocessed" indicates that processes in steps S802 to S809 have not been executed yet. If the job control unit 304 determines that there is no unprocessed paper feeding unit ID, the processing in FIG. 8 ends. If the job control unit 304 determines that there is an unprocessed paper feeding unit ID, it specifies one paper feeding unit ID in the order of sorting, and the process advances to step S803.

In step S803, the job control unit 304 determines whether substitute paper has been set for a paper setting corresponding to the specified paper feeding unit ID. The state in which substitute paper has been set is a state in which substitute paper has been set in step S611 of FIG. 6. If the job control unit 304 determines that the substitute paper has been set, it sets the substitute paper setting as the processing target in FIG. 8 in step S804. If the job control unit 304 determines that no substitute paper has been set, it sets the current paper setting as the processing target in FIG. 8, and the process advances to step S805.

In step S805, the job control unit 304 determines whether the paper feeding unit ID indicates automatic paper feeding unit designation. For example, when "Auto" is displayed in FIG. 5, the paper feeding unit ID indicates automatic paper feeding unit designation. For "Auto" display, if paper of a designated paper size and medium type exists in a paper feeding unit of the printing apparatus 101, paper can be automatically fed from the paper feeding unit. Fixed paper feeding unit designation is, for example, display of [1] to [3] in FIG. 5. If the job control unit 304 determines in step S805 that the paper feeding unit ID indicates automatic paper feeding unit designation, the process advances to step S809. If the job control unit 304 determines that the paper feeding unit ID does not indicate automatic paper feeding unit designation, that is, indicates fixed paper feeding unit designation, the process advances to step S806.

If a plurality of paper settings designate the paper feeding unit ID, the job control unit 304 determines in step S806 whether there is even one paper setting having a different paper size. If the job control unit 304 determines that there is even one paper setting having a different paper size, it stores the paper feeding unit ID in the RAM 204 in step S808, and the process advances to step S809. If the job control unit 304 determines that there is no paper setting having a different paper size, the process advances to step S807.

If a plurality of paper settings designate the paper feeding unit ID, the job control unit 304 determines in step S807 whether there is even one paper setting having a different medium type. If the job control unit 304 determines that there is even one paper setting having a different medium type, it stores the paper feeding unit ID in the RAM 204 in step S808, and the process advances to step S809. If the job control unit 304 determines that there is no paper setting having a different medium type, the process advances to step S809. In step S809, the job control unit 304 specifies the next paper feeding unit ID in the order of sorting, and repeats the processing from step S802.

In the embodiment, by the processing of FIG. 8, whether a plurality of different paper settings have been made for one paper feeding unit is determined for each paper setting used by a plurality of jobs selected by the user (whether the paper setting of a job other than the target job designates the same paper feeding unit). If it is determined that a plurality of different paper settings have been made for one paper feeding unit, a warning can be displayed for the determined paper setting, as in the third and fourth lines in FIG. 5.

Figure 9:
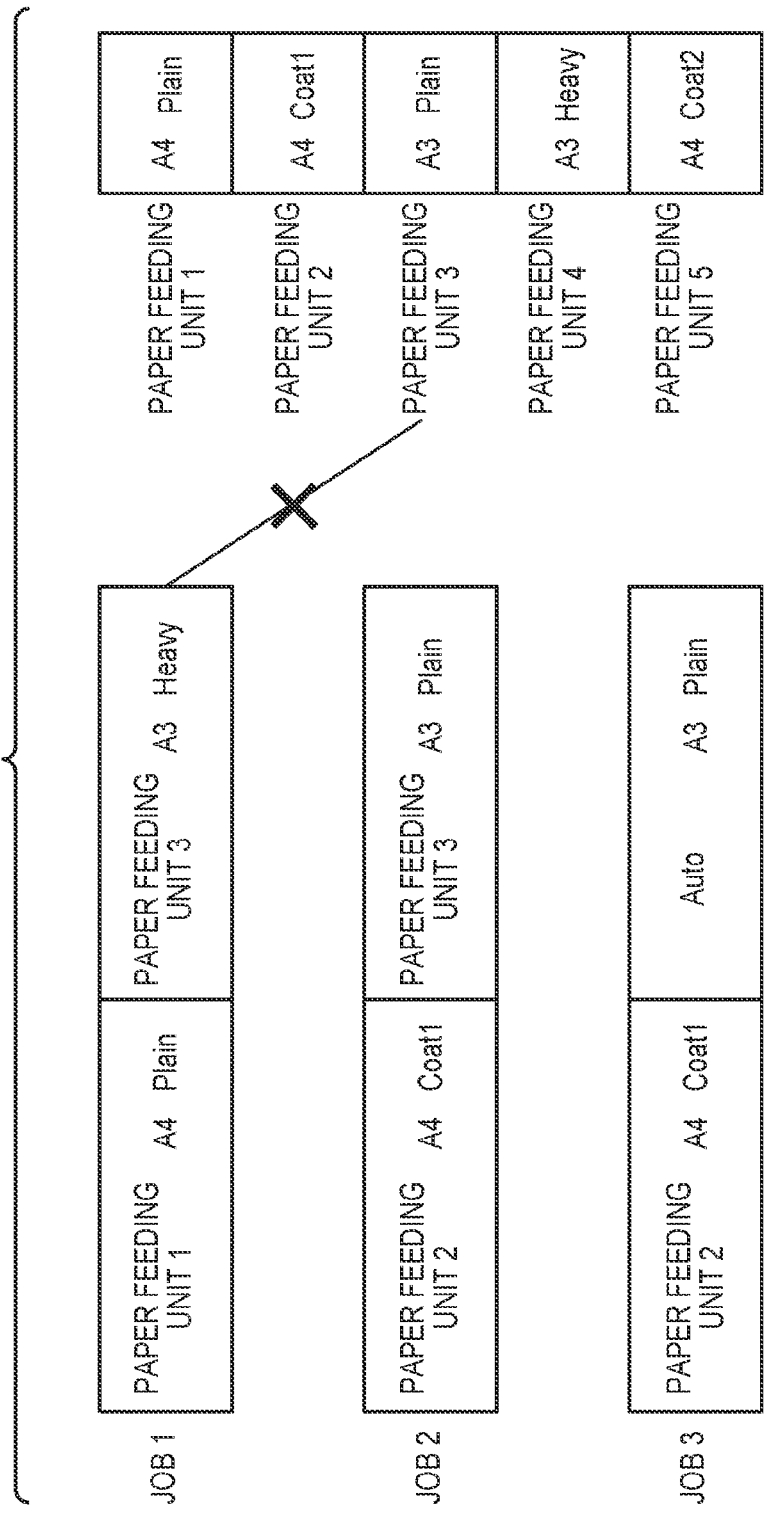
FIG. 9 is a view showing an example of the paper setting of a job selected by an operator.

In the embodiment, for example, assume that jobs selected by an operator (user) are three jobs 1 to 3 as shown in FIG. 9. Job 1 uses two paper settings "paper feeding unit 1, A4, Plain" and "paper feeding unit 3, A3, Heavy". Job 2 uses two paper settings "paper feeding unit 2, A4, Coat 1" and "paper feeding unit 3, A3, Plain". Job 3 uses two paper settings "paper feeding unit 2, A4, Coat 1" and "Auto, A3, Plain". Also, assume that the respective paper feeding units of the printing apparatus 101 are set as in paper feeding units 1 to 5 shown in FIG. 9.

If the operator selects three jobs 1 to 3 on the job list 402 of FIG. 4 and presses the update button 406, the processing of FIG. 6 is executed and the icon 405 is displayed based on the processing result of step S606. From this display, the operator recognizes that a medium mismatch has occurred for the paper setting of job 1. At this time, if the operator presses the paper substitution button 407, the screen changes to the paper substitution screen of FIG. 5. On the paper substitution screen of FIG. 5, the state in which a medium mismatch has occurred for the paper setting "paper feeding unit 3, A3, Heavy" on the third line is displayed as the icon 505 based on the processing result of step S606.

To cancel the medium mismatch on the third line, the operator can replace the paper of paper feeding unit 3 to change the paper setting of the paper feeding unit from "A3, Plain" to "A3, Heavy". Since the paper settings on the third and fourth lines in FIG. 5 are displayed to be discriminable, the operator recognizes that two different paper settings designate the same paper feeding unit. That is, the operator can easily recognize that, if paper of paper feeding unit 3 is replaced, this influences another paper setting. Even if the operator does not notice the warning display and actually changes the paper setting, the process returns from step S611 to S606 in FIG. 6 to repeat a series of processes and newly display the icon 505 on the fourth line. As a result, the operator recognizes before printing that a change of the paper setting has influenced another paper setting. In a case as in FIG. 5, for example, the operator substitutes the paper setting of another paper feeding unit for the paper setting on the third line, or changes the paper setting of paper feeding unit 3. When the paper setting of paper feeding unit 3 is changed, a medium mismatch is canceled by substituting the paper setting of another paper feeding unit for the paper setting on the fourth line.

[Second Embodiment]

Figure 10:
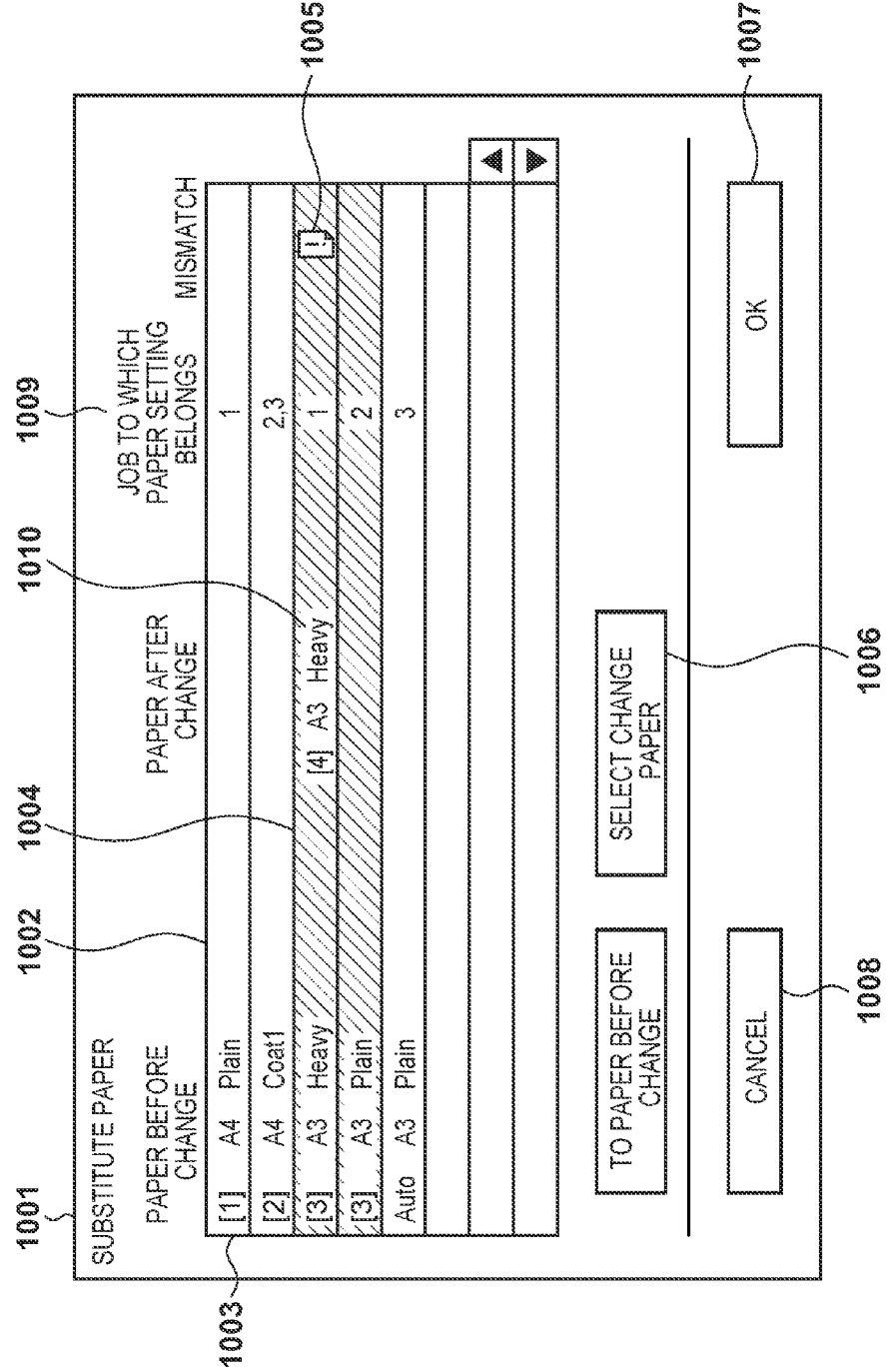
FIG. 10 is a view showing an example of a paper substitution screen according to the second embodiment.

A difference of the second embodiment from the first embodiment will be described below. FIG. 10 is a view showing an example of a paper substitution screen according to the embodiment. A paper substitution screen 1001 is displayed when a button 407 in FIG. 4 is pressed. A list 1002 displays a list of all paper settings used by all jobs selected in a job list 402. A display 1003 represents a paper setting "paper feeding unit 1, A4 size, medium type: Plain". As for a paper setting for which the background color is white, as in the display 1003, no substitute paper is set, and no medium mismatch has occurred. In a display 1004, a state in which two different paper settings on the third and fourth lines are made for paper feeding unit 3 is displayed in a discriminable background color. An icon 1005 represents that a medium mismatch has occurred. A button 1006 is a button for changing to a substitute paper selection screen (not shown). A button 1007 is a button for finalizing substitute paper selected on the substitute paper selection screen. A button 1008 is a button for canceling contents set on the paper substitution screen 1001. A display 1009 represents a job using each paper setting. A display 1010 represents a paper setting serving as a substitute candidate.

Figure 11:
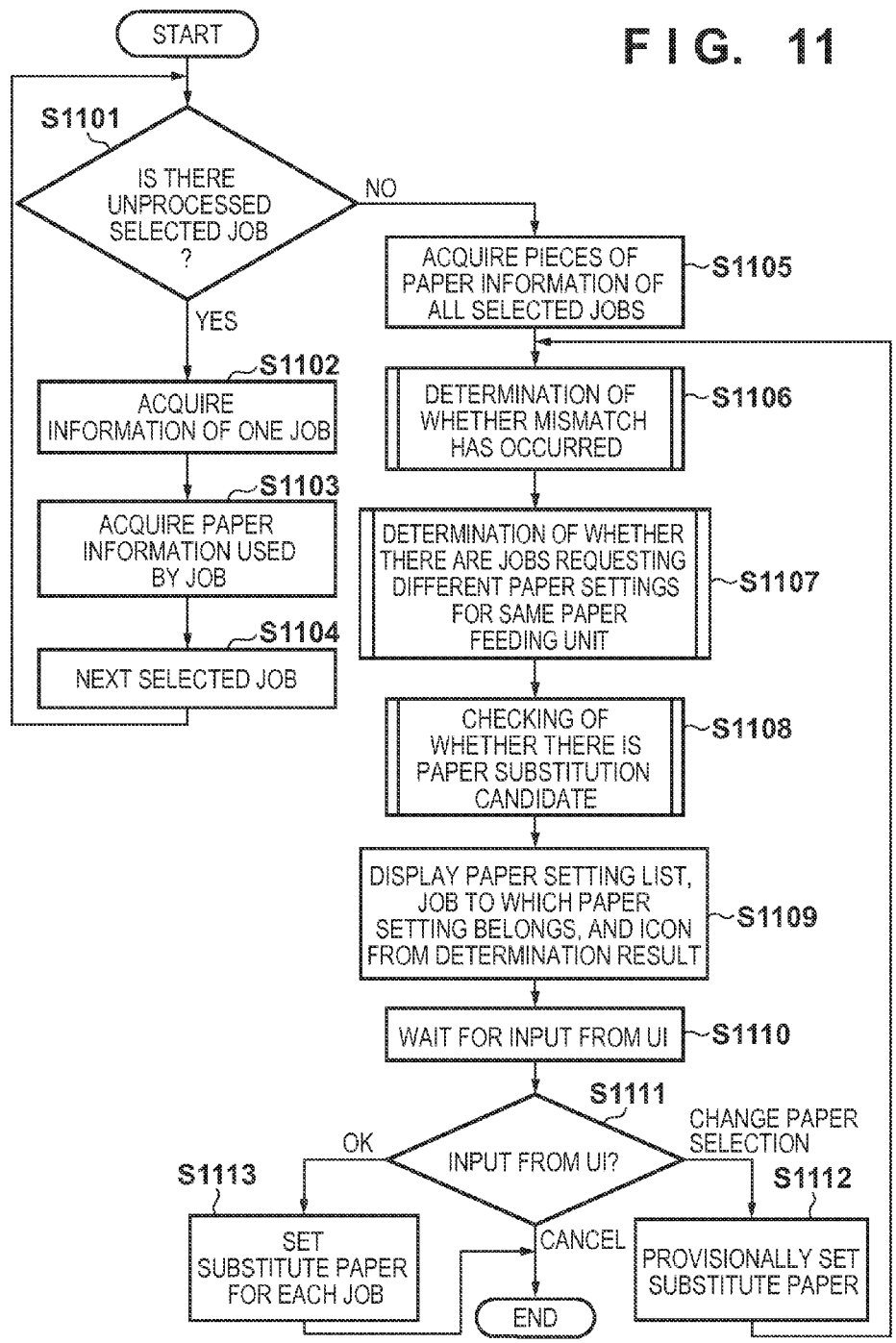
FIG. 11 is a flowchart showing the procedures of paper substitution screen display processing.

FIG. 11 is a flowchart showing the procedures of paper substitution screen display processing according to the embodiment. A description of steps S1101 to S1107 is the same as that of steps S601 to S607 in FIG. 6.

In step S1108, a job control unit 304 specifies a paper setting serving as a substitute candidate of a paper setting in which a medium mismatch has occurred. Details of the processing in step S1108 will be described later. In step S1109, the job control unit 304 displays a paper substitution screen as shown in FIG. 10 on an operation unit 201 based on the processing results of steps S1106 to S1108. The display 1010 in FIG. 10 represents a paper setting specified as a candidate in step S1108. From the processing of step S1103, the job control unit 304 recognizes a job from which each paper setting has been acquired. Based on the processing of step S1103, the job control unit 304 displays, as the display 1009 in FIG. 10, the identification number of a job using each paper setting. A description of steps S1110 to S1113 is the same as that of steps S609 to S612 in FIG. 6.

Figure 12:
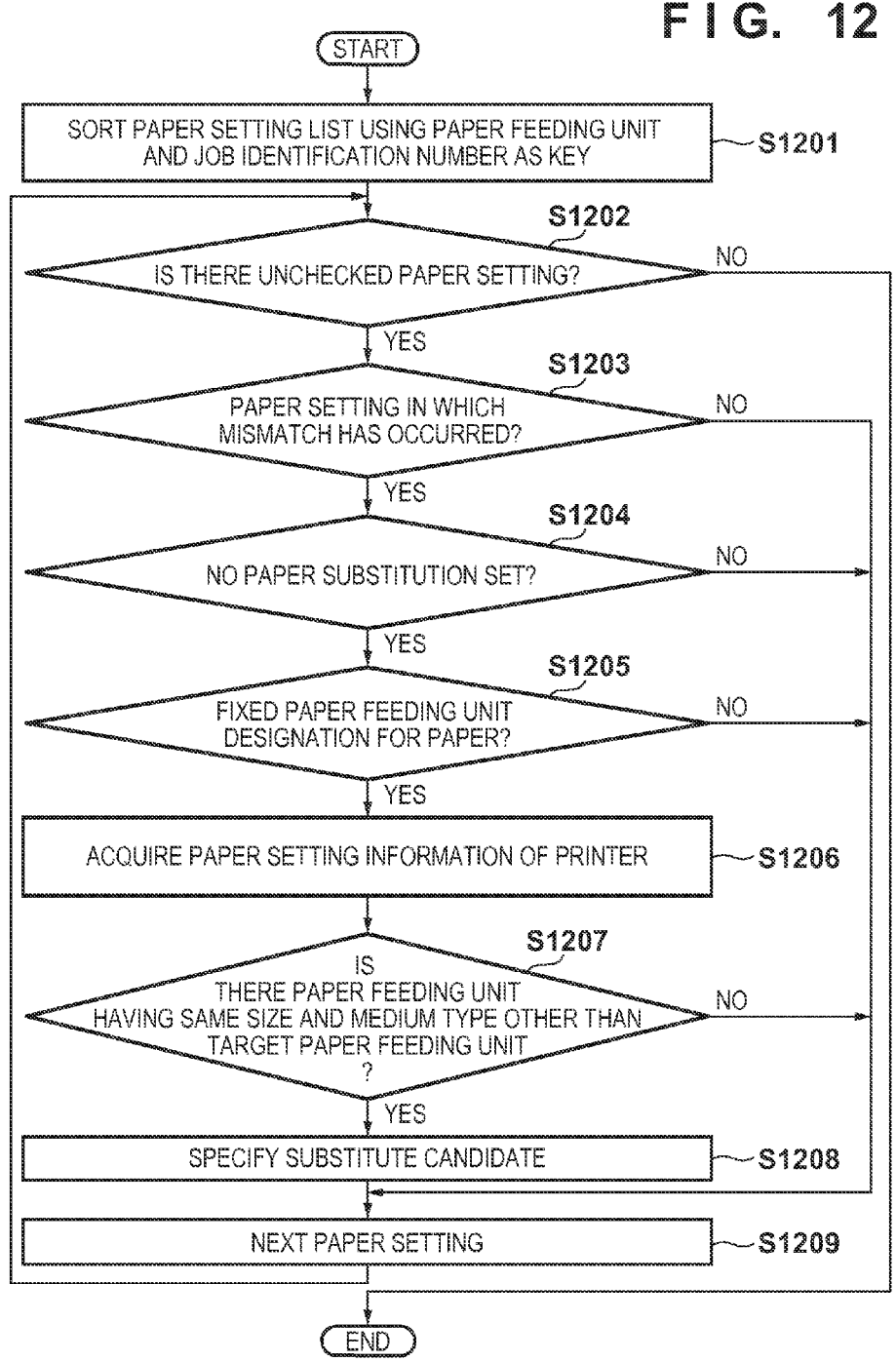
FIG. 12 is a flowchart showing the detailed procedures of processing in step S1108.

FIG. 12 is a flowchart showing the detailed procedures of the processing in step S1108 of FIG. 11. In step S1201, the job control unit 304 sorts paper settings stored for each job in step S1105 by using the paper feeding unit ID and the identification number of a job using the paper setting as a key. In step S1202, the job control unit 304 determines whether there is an unprocessed paper setting among paper settings stored for each job in step S1105. "Unprocessed" indicates that processes in steps S1203 to S1209 have not been executed yet. If the job control unit 304 determines that there is no unprocessed paper setting, the processing in FIG. 12 ends. If the job control unit 304 determines that there is an unprocessed paper setting, it specifies one paper setting in the order of sorting, and the process advances to step S1203.

In step S1203, the job control unit 304 determines whether a medium mismatch has occurred for the specified paper setting. If the job control unit 304 determines that no medium mismatch has occurred, the process advances to step S1209. If the job control unit 304 determines that a medium mismatch has occurred, the process advances to step S1204.

In step S1204, the job control unit 304 determines whether substitute paper has been set for the paper setting. The state in which substitute paper has been set is a state in which substitute paper has been set in step S1112 of FIG. 11. If the job control unit 304 determines that the substitute paper has been set, the process advances to step S1209. This means that the substitute paper has been set based on the operator's intention. In this case, even if a medium mismatch occurs, no substitute candidate specifying processing is performed. If the job control unit 304 determines that no substitute paper has been set, the process advances to step S1205.

In step S1205, the job control unit 304 determines whether the paper setting has fixed paper feeding unit designation. If the job control unit 304 determines that the paper setting does not have fixed paper feeding unit designation, that is, has automatic paper feeding unit designation, the process advances to step S1209. This is because, for automatic paper feeding unit designation, if a paper feeding unit has this paper setting, paper is automatically fed from this paper feeding unit, and no substitute candidate need be specified. If the job control unit 304 determines that the paper setting has fixed paper feeding unit designation, the process advances to step S1206.

In step S1206, the job control unit 304 acquires paper settings made for paper feeding units 308 to 312 of a printing apparatus 101. In step S1207, the job control unit 304 searches paper feeding units for a paper feeding unit having the same paper size and medium type, except for a paper feeding unit having fixed paper feeding unit designation of the currently processing target paper setting. Then, the job control unit 304 determines the presence/absence of such a paper feeding unit. If the job control unit 304 determines that there is no paper feeding unit having the same paper size and medium type, the process advances to step S1209. If the job control unit 304 determines that there is a paper feeding unit having the same paper size and medium type, the process advances to step S1208.

In step S1208, the job control unit 304 specifies, as a substitute paper setting candidate, the paper size and medium type of the paper feeding unit having the same paper size and medium type. In step S1209, the job control unit 304 specifies the next paper setting in the order of sorting, and repeats the processing from step S1202.

From the screen of FIG. 10, the operator recognizes that a medium mismatch has occurred in the third paper setting and a change of the paper setting of paper feeding unit 3 generates a mismatch in another paper setting. Also, the user recognizes from the display 1010 that the paper setting of paper feeding unit 4 can be designated as a substitute paper setting not to generate a mismatch in the other paper setting.

According to the embodiment, only a paper setting having a matching paper size and medium type is specified as a candidate in step S1207. However, it is also possible to define predetermined similarity ranges for the paper size and medium type, and if a paper size and medium type fall within these ranges, regard them as a matching paper size and medium type.

[Third Embodiment]

Figure 13:
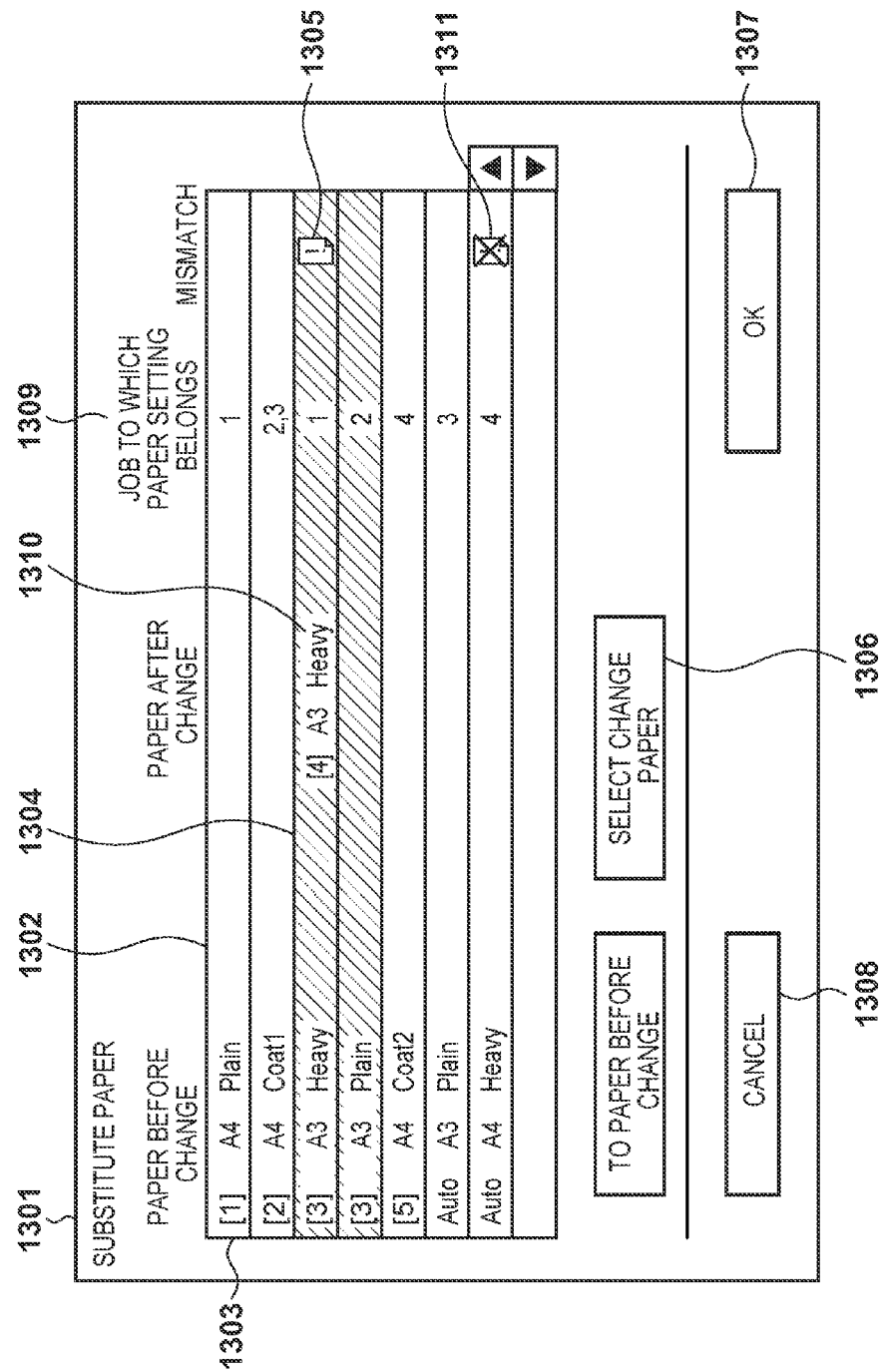
FIG. 13 is a view showing an example of a paper substitution screen according to the third embodiment.

A difference of the third embodiment from the first embodiment will be described below. FIG. 13 is a view showing an example of a paper substitution screen according to the embodiment. A paper substitution screen 1301 is displayed when a button 407 in FIG. 4 is pressed. A list 1302 displays a list of all paper settings used by all jobs selected in a job list 402. A display 1303 represents a paper setting "paper feeding unit 1, A4 size, medium type: Plain". As for a paper setting for which the background color is white, as in the display 1303, no substitute paper is set, and no medium mismatch has occurred. In a display 1304, a state in which two different paper settings on the third and fourth lines are made for paper feeding unit 3 is displayed in a discriminable background color. An icon 1305 represents that a medium mismatch has occurred. A button 1306 is a button for changing to a substitute paper selection screen. A button 1307 is a button for finalizing substitute paper selected on the substitute paper selection screen. A button 1308 is a button for canceling contents set on the paper substitution screen 1301. A display 1309 represents a job using each paper setting. A display 1310 represents a paper setting serving as a substitute candidate.

In the embodiment, the user selects, as the fourth job, a job using two paper settings "paper feeding unit 5, A4, Coat 2" and "Auto, A4, Heavy", in addition to the three jobs shown in FIG. 9.

An icon 1311 in FIG. 13 represents that a medium mismatch has occurred for the paper setting and cannot be canceled. Particularly when the order of selection of jobs by the user is considered, the icon 1311 indicates that a medium mismatch cannot be canceled for a paper setting used by a job late in the order of selection, that is, the fourth job. That is, a substitute paper setting candidate can be specified preferentially for a job early in the order of selection. As a result, if a substitute paper setting is impossible for a job late in the order of selection, this is displayed as in the icon 1311.

Figure 14:
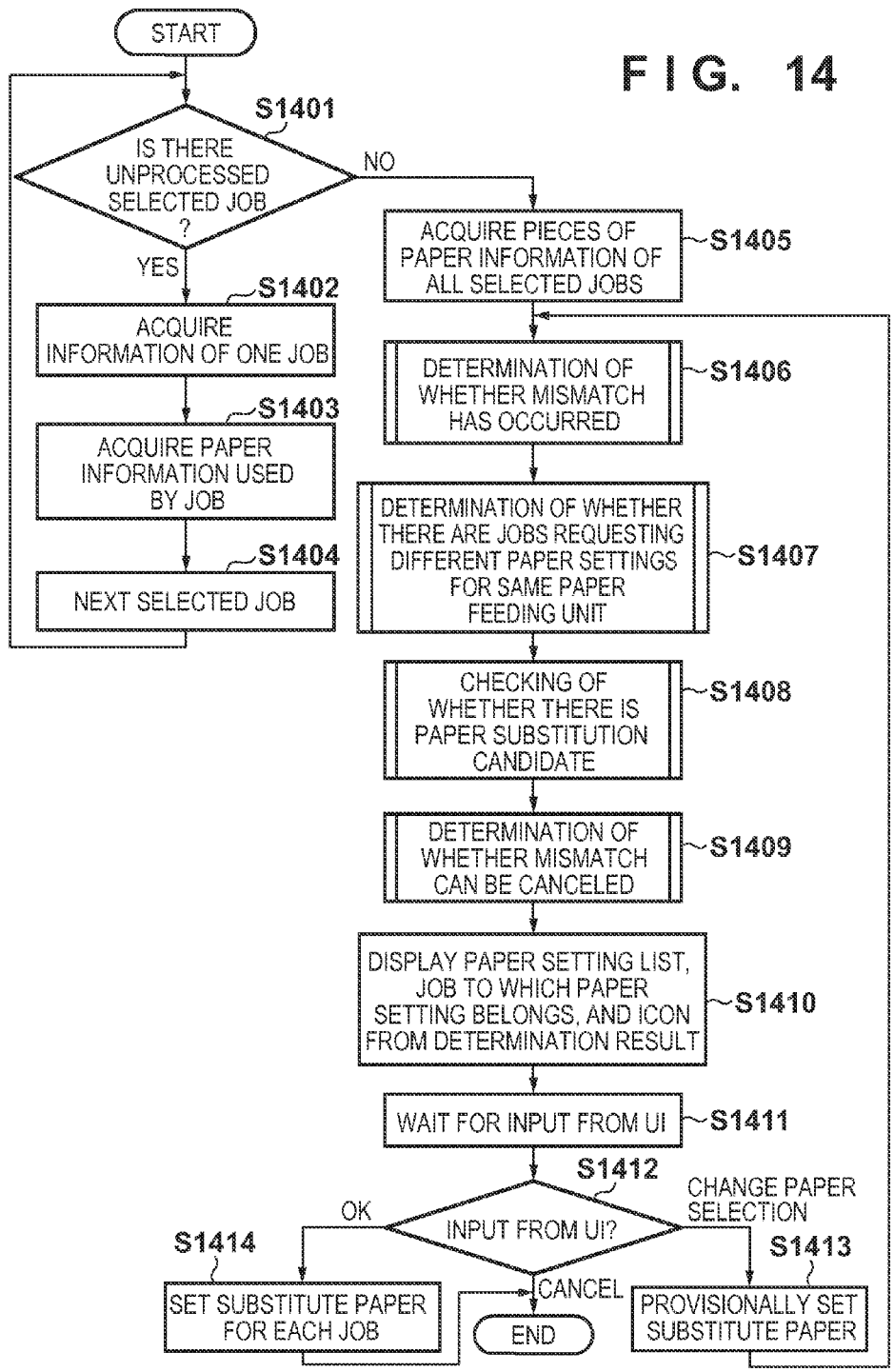
FIG. 14 is a flowchart showing the procedures of paper substitution screen display processing.

FIG. 14 is a flowchart showing the procedures of paper substitution screen display processing according to the embodiment. A description of steps S1401 to S1408 is the same as that of steps S1101 to S1108 in FIG. 11.

In step S1409, a job control unit 304 determines whether all medium mismatches can be canceled. Details of the processing in step S1409 will be described later. In step S1410, the job control unit 304 displays the icon 1311 based on the processing results of steps S1407 to S1409, as shown in FIG. 13. In FIG. 13, the icon 1311 represents that all medium mismatches cannot be canceled and one medium mismatch remains. A description of steps S1411 to S1414 is the same as that of steps S1110 to S1113 in FIG. 11.

FIG. 15 is a flowchart showing the detailed procedures of the processing in step S1409 of FIG. 14. In step S1501, the job control unit 304 acquires the number of paper feeding units of a printing apparatus 101 from a printer engine 202 via a printer control unit 306. In step S1502, the job control unit 304 determines whether there is an unprocessed paper setting among paper settings stored for each job in step S1405. "Unprocessed" indicates that processes in steps S1503 to S1506 have not been executed yet. If the job control unit 304 determines that there is no unprocessed paper setting, the process advances to step S1507. If the job control unit 304 determines that there is an unprocessed paper setting, it specifies one paper setting, and the process advances to step S1503. For example, a paper setting may be specified in the order of storage in a RAM 204 in step S1405.

In step S1503, the job control unit 304 determines whether substitute paper has been set for the specified paper setting. If the job control unit 304 determines that the substitute paper has been set, it sets the substitute paper setting as the processing target in FIG. 15 in step S1504, and the process advances to step S1505. If the job control unit 304 determines that no substitute paper has been set, the process advances to step S1505.

In step S1505, the job control unit 304 stores, in the RAM 204, a paper size and medium type other than a paper feeding unit in information of the paper setting. At this time, only a paper setting having a paper size and medium type different from those stored before is stored. That is, by performing the processes in steps S1502 to S1506 for each paper setting, a list of paper settings having different paper sizes and medium types is created. For example, "paper feeding unit 1, A4, Plain", "paper feeding unit 2, A4, Plain", and "paper feeding unit Auto, A4, Plain" are handled as the same paper setting in step S1505. In step S1506, the job control unit 304 specifies the next paper setting, and repeats the processing from step S1502.

In step S1507, the job control unit 304 determines whether the number of paper feeding units acquired in step S1501 is smaller than the number of paper settings listed in step S1505. If the job control unit 304 determines that the number of paper feeding units is equal to or larger than the number of listed paper settings, it determines that all medium mismatches generated for the plurality of jobs selected by the user can be canceled, and the processing in FIG. 15 ends. To the contrary, if the job control unit 304 determines that the number of paper feeding units is smaller than the number of listed paper settings, it calculates the shortage (difference) in step S1508.

In step S1509, the job control unit 304 determines that medium mismatches cannot be canceled by the shortage in the descending order of the identification numbers of jobs using paper settings in which medium mismatches have occurred (later in the order of selection by the user). After that, the processing in FIG. 15 ends. The icon 1311 is displayed for a paper setting used by a job for which it is determined in step S1509 that a medium mismatch cannot be canceled.

As shown in FIG. 13, four jobs selected by the user use seven paper settings, and medium mismatches have occurred for the third and seventh paper settings. When the processing in step S1505 is performed for these paper settings, paper settings are narrowed down to six types "A4, Plain", "A4, Coat 1", "A3, Heavy", "A3, Plain", "A4, Coat 2", and "A4, Heavy". However, the printing apparatus 101 has only five paper feeding units, as shown in FIG. 9. That is, medium mismatches cannot be canceled for all the four jobs. Thus, the icon 1311 is displayed for a medium mismatch in a paper setting used by a job late in the order of selection by the user. From the icon 1311, the user recognizes that a medium mismatch in the third paper setting can be canceled by substituting paper feeding unit 4, but a medium mismatch in the seventh paper setting cannot be easily canceled. Generally in such a case, the operator often excludes a finally selected job from printing targets at the same time. Therefore, a display in which a medium mismatch cannot be canceled for the paper setting "paper feeding unit Auto, A4, Heavy" of the fourth job late in the order of selection meets the operator's intention. In the case of FIG. 13, the operator may be allowed to select whether to perform medium mismatch determination again after excluding the fourth job from choices, to substitute a paper setting having a different paper size or medium type, or to forcibly display a paper exchange request.

<Other Embodiments>

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138441, filed Jul. 1, 2013, which is hereby incorporated by reference herein in its entirety.

What is claimed is:

1. A printing apparatus which prints on a sheet conveyed from one of sheet storage units, comprising:
   a storage unit configured to store a plurality of jobs containing attributes of sheets to be used for printing;
   a first determination unit configured to determine whether an attribute of the sheet of a job stored in said storage unit is different from an attribute of a sheet in a sheet storage unit designated by the job;
   a second determination unit configured to, in a case where said first determination unit determines that the attribute of the sheet of the job stored in said storage unit is different from the attribute of the sheet in the sheet storage unit, determine whether the sheet storage unit is designated by another job different from the job out of the plurality of jobs; and
   a notification unit configured to, in a case where said second determination unit determines that the sheet storage unit is designated by the another job, notify that the sheet storage unit is designated by the another job.

2. The apparatus according to claim 1, further comprising a search unit configured to, in a case where said first determination unit determines that the attribute of the sheet of the job stored in said storage unit is different from the attribute of the sheet in the sheet storage unit, search for a sheet storage unit corresponding to the attribute of the sheet of the job,
   wherein said notification unit further notifies, in a case where said second determination unit determines that the sheet storage unit is designated by the another job, an attribute of a sheet of the sheet storage unit searched by said search unit.

3. The apparatus according to claim 1, further comprising:
   a third determination unit configured to determine whether a number of sheet storage units of the printing apparatus is smaller than a number of attributes of sheets contained in the plurality of jobs; and
   a specifying unit configured to, in a case where said third determination unit determines that the number of the sheet storage units is smaller than the number of attributes of sheets contained in the plurality of jobs, specify, from the attributes of sheets contained in the plurality of jobs, an attribute of a sheet corresponding to a difference between the number of the sheet storage units and the number of attributes of sheets contained in the plurality of jobs,
   wherein in a case where said first determination unit determines that the attribute of the sheet specified by said specifying unit is different from the attribute of the sheet in the sheet storage unit, said notification unit further notifies, a state in which the difference cannot be resolved.

4. The apparatus according to claim 3, further comprising an acceptance unit configured to accept designation of the plurality of jobs by a user,
wherein said specifying unit specifies the attribute of the sheet corresponding to the difference based on order of designation of the plurality of jobs by the user.

5. The apparatus according to claim 4, wherein said specifying unit specifies the attribute of the sheet corresponding to the difference in descending order of designation of the plurality of jobs by the user.

6. The apparatus according to claim 1, further comprising a display control unit configured to display a list of attributes of sheets contained in the plurality of jobs, and display the attribute of the sheet determined by said first determination unit to be different from the attribute of the sheet in the sheet storage unit, and an attribute of a sheet set for the sheet storage unit designated by the another job, so as to be discriminable from other jobs in the list.

7. The apparatus according to claim 1, wherein for the attribute of the sheet determined by said first determination unit to be different from the attribute of the sheet in the sheet storage unit, said notification unit further notifies a message that a paper setting is different.

8. A display control method to be executed in a printing apparatus which includes a storage unit configured to store a plurality of jobs containing attributes of sheets to be used for printing, and which prints on a sheet conveyed from one of sheet storage units, comprising:
   a first determination step of determining whether an attribute of the sheet of a job stored in the storage unit is different from an attribute of a sheet in a sheet storage unit designated by the job;
   a second determination step of, in a case where the attribute of the sheet of the job stored in the storage unit is determined in the first determination step to be different from the attribute of the sheet in the sheet storage unit, determining whether the sheet storage unit is designated by another job different from the job out of the plurality of jobs; and
   a notification step of, in a case where it is determined in the second determination step that the sheet storage unit is designated by the another job, notifying that the sheet storage unit is designated by the another job.

9. A non-transitory computer-readable storage medium storing a program for causing a computer including a storage unit configured to store a plurality of jobs containing attributes of sheets to be used for printing, to print on a sheet conveyed from one of sheet storage units, the program causing the computer to execute:
   a first determination step of determining whether an attribute of the sheet of a job stored in the storage unit is different from an attribute of a sheet in a sheet storage unit designated by the job;
   a second determination step of, in a case where the attribute of the sheet of the job stored in the storage unit is determined in the first determination step to be different from the attribute of the sheet in the sheet storage unit, determining whether the sheets storage unit is designated by another job different from the job out of the plurality of jobs; and
   a notification step of, in a case where it is determined in the second determination step that the sheet storage unit is designated by the another job, notifying that the sheet storage unit is designated by the another job.

* * * * *